(12) United States Patent
Chang et al.

(10) Patent No.: US 7,737,661 B2
(45) Date of Patent: Jun. 15, 2010

(54) SECONDARY BATTERY HAVING CONSTANT-VOLTAGE DEVICE

(75) Inventors: Sung Kyun Chang, Daejeon (KR); Jeong Ju Cho, Daejeon (KR); Jae Hyun Lee, Daejeon (KR); Joon Hwan Lee, Daejeon (KR); Eui Yong Bang, Gunsan-si (KR); Soo Hyun Ha, Busan (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 11/208,059

(22) Filed: Aug. 19, 2005

(65) Prior Publication Data

US 2006/0038534 A1    Feb. 23, 2006

(30) Foreign Application Priority Data

Aug. 20, 2004  (KR) .................... 10-2004-0065928

(51) Int. Cl.
*H02J 7/00*    (2006.01)
(52) U.S. Cl. ................. 320/134; 320/136; 324/427
(58) Field of Classification Search ............. 320/134, 320/136; 324/427
See application file for complete search history.

(56) References Cited

U.S. PATENT DOCUMENTS

| | | | |
|---|---|---|---|
| 4,719,401 A * | 1/1988 | Altmejd ................ | 320/122 |
| 5,561,005 A | 10/1996 | Omaru et al. ............ | 429/197 |
| 5,861,730 A | 1/1999 | Lee ........................ | 320/106 |
| 6,060,185 A | 5/2000 | Okutoh .................. | 429/7 |
| 6,331,763 B1 * | 12/2001 | Thomas et al. ........... | 320/136 |
| 6,331,764 B1 | 12/2001 | Oglesbee et al. | |
| 6,608,470 B1 | 8/2003 | Oglesbee et al. | |

(Continued)

FOREIGN PATENT DOCUMENTS

JP    05-325943    12/1993

(Continued)

OTHER PUBLICATIONS

PCT International Search Report for Application No. PCT/KR2005/002680; Date of Mailing International Search Report: Nov. 24, 2005 (All references cited in search report are cited above).

(Continued)

*Primary Examiner*—Patrick J Assouad
*Assistant Examiner*—Aaron Piggush
(74) *Attorney, Agent, or Firm*—Cantor Colburn LLP

(57) ABSTRACT

Disclosed is a secondary battery having a constant-voltage device for preventing the secondary battery from being excessively overcharged. The breakdown voltage of the constant-voltage device is lower than the explosion or ignition voltage of the secondary battery, so the discharge operation may occur before the secondary battery is exploded or ignited even if the voltage of the secondary battery rises above the overcharge voltage, thereby protecting the secondary battery from explosion or ignition. The leakage current value of the constant-voltage device is less than 0.05% of the capacity value of the secondary battery under the maximum charge voltage of the secondary battery, or the breakdown voltage of the constant-voltage device is higher than the maximum charge voltage of the secondary battery. Thus, the constant-voltage device rarely generates the leakage current even if the secondary battery has been charged with the maximum charge voltage.

8 Claims, 3 Drawing Sheets

U.S. PATENT DOCUMENTS

2002/0039270 A1* 4/2002 Sato .......................... 361/93.1
2003/0076642 A1* 4/2003 Shiner et al. ............... 361/91.6

FOREIGN PATENT DOCUMENTS

| JP | 05325943 | 12/1993 |
| JP | 2003-284237 | 10/2003 |
| JP | 1020040037547 | 5/2004 |
| JP | 1020050009432 | 9/2005 |
| WO | 99/39421 | 8/1999 |

OTHER PUBLICATIONS

Supplementary European Search Report for Application No.: 05780549.1-2119; Dated: Apr. 18, 2008.

* cited by examiner constant-voltage device
connected to inner portion
of cell constant-voltage device
connected to outer portion
of cell

SECONDARY BATTERY HAVING CONSTANT-VOLTAGE DEVICE

TECHNICAL FIELD

The present invention relates to a secondary battery having a constant-voltage device. More particularly, the present invention relates to a secondary battery having a constant-voltage device capable of preventing accidental ignition or explosion of the secondary battery. In addition, the present invention relates to a method for preventing accidental ignition or explosion of a secondary battery caused by an overcharge of the secondary battery.

BACKGROUND ART

Secondary batteries are rechargeable batteries including Ni—Cd batteries, Ni—MH batteries, and lithium ion batteries. Recently, the lithium ion batteries having energy density higher than that of the Ni—Cd batteries or the Ni—MH batteries have been extensively used. The lithium ion battery can be fabricated in a compact size with a light weight, so the lithium ion battery can be effectively utilized as a power source for portable electronic appliances, such as portable phones, camcorders or notebook computers. In addition, the lithium ion battery is extensively used as a power source for an electric vehicle, so the lithium ion battery has been currently spotlighted as a next-generation energy storage medium.

However, the secondary battery, in particular, the lithium ion battery is vulnerable to overcharge. Such an overcharge may cause accidental ignition or explosion of the lithium ion battery, thereby incurring a dangerous accident or property loss. Therefore, it is necessary to prevent or restrict the overcharge of the secondary battery or to solve problems derived from the overcharge of the secondary battery.

For instance, when the lithium ion battery is subject to the overcharge, a side reaction may increasingly occur between a cathode active material and an electrolyte of the lithium ion battery. Such side reaction destroys the structure of the cathode active material while causing an oxidation reaction of the electrolyte. In the meantime, lithium may be deposited on an anode active material consisting of graphite, etc. If the voltage of the secondary battery rises in a state in which the secondary battery has been overcharged, accidental ignition or explosion of the secondary battery may occur.

The above problem may become serious if the secondary battery is used for a high voltage power source. For instance, if the lithium ion secondary battery is charged by the power source of a vehicle through cigar jack, 12V is applied in cases of automobiles, and 24V is applied in cases of freight cars by connecting two power sources of 12V in series. In this case, if an excessive voltage deviating from the standard for the secondary battery is suddenly applied to the secondary battery, a dangerous accident may occur, so that it is necessary to provide a safety device capable of effectively protecting the secondary battery from the excessive voltage.

In the meantime, recently, there are great demands for safety devices that can be fabricated with a simple structure at a low cost. That is, it is necessary to provide an inexpensive safety device having a simple structure than that of a conventional safety device equipped with a protective circuit, such as a PTC circuit.

Currently, structural characteristics of an electrolyte, a separator film and an electrode of the secondary battery have been improved, so an electrolyte and electrode assembly is provided with a safety means capable of preventing the secondary battery from being overcharged. Thus, there are various attempts to fabricate the secondary battery by using a bare cell only without employing a protective circuit in order to reduce the manufacturing cost of the secondary battery. However, even in this case, a basic safety means should be provided in the secondary battery to prevent the overcharge of the secondary battery or accidents derived from the overcharge of the secondary battery.

For instance, Japanese Patent Unexamined Publication Nos. 5-325943 and 2003-284237, and U.S. Pat. No. 6,331,763 disclose a zener diode and a thermal fuse as a safety device for the secondary battery. According to the above conventional technologies, two thermal fuses, which are connected to each other in series, and one zener diode are inserted into the secondary battery.

In this case, the current may flow towards the zener diode other than the battery cell when the secondary battery is subject to the overcharge, so that the thermal fuse connected to the zener diode is cut off due to heat derived from the excessive current applied to the zener diode, thereby shutting off the current being applied to the secondary battery. Japanese Patent Unexamined Publication Nos. 5-325943 and 2003-284237 disclose that it is preferred to use a zener diode having a breakdown voltage (zener voltage) similar to or higher than a maximum charge voltage of the battery. In addition, U.S. Pat. No. 6,331,763 discloses a zener diode having a breakdown voltage lower than the maximum charge voltage of the battery.

The battery or the cell can be prevented from being overcharged if the breakdown voltage of the zener diode is lower than the charge voltage of the battery or if the breakdown voltage of the zener diode is identical to or slightly higher than the charge voltage of the battery. However, in this case, the zener diode may have the leakage current. That is, the above conventional technologies cannot solve the problem of self-discharge of the battery caused by the leakage current of the zener diode.

It is generally known in the art that the zener diode has the leakage current under a predetermined voltage lower than the breakdown voltage of the zener diode by at least 1V. Thus, in a case of the battery, the zener diode inevitably causes the leakage current in the range of the operating voltage of the battery (less than 4.2V). If the leakage current occurs at a device connected to a cathode and an anode of the battery, the battery may be self-discharged, so that the operating time of the battery may be reduced after the battery has been charged and life span of the battery may be shortened. Therefore, according to the above conventional technologies, current reduction may always occur in the battery.

That is, if the leakage current occurs at the device connected between the cathode and the anode of the battery, the battery is self-discharged so that the life span of the battery may be shortened. Thus, if the zener diode is attached between the cathode and the anode of the battery, current reduction may always occur in the battery. If a zener diode, which does not cause the leakage current in the charge voltage of the battery, is used for the battery, the current cannot be sufficiently discharged when the battery is subject to the overcharge. In addition, when a high current is applied to the zener diode, the zener diode is broken so that the zener diode may not play its original role and if the voltage rises, the resistance also increases so that the current is interrupted. In the meantime, according to the above conventional technologies, the current is shut off by means of the thermal fuse when the zener diode is subject to overheat. However, in this case, it is difficult to prevent the leakage current of the zener diode under the charge voltage (4.2V-4.5V) of the battery because the thermal fuse should operate at the temperature above 60° C., which is a normal operating temperature of the battery, and a voltage difference of at least 0.5V is necessary in order to allow the zener diode suitable for the current of 50 to 200 mA, a normal charge current of a secondary battery generally used, to reach the temperature of 60° C. In particular, the above zener diode, which does not cause the leakage current under the charge voltage (4.2V-4.5V) of the battery, is not adaptable when it is necessary to apply the current of 50 to 200 mA to the zener diode without causing the overcharge of the battery. Although the above conventional technologies disclose the charge/discharge cycle for the battery, they do not suggest the solution for the self-discharge of the battery caused by the leakage current of the zener diode.

DISCLOSURE OF THE INVENTION

Inventors of the present invention have performed research and studies on a secondary battery having a safety device capable of protecting the secondary battery from accidents by preventing accidental ignition or explosion of the secondary battery caused by the overcharge of the secondary battery while minimizing the leakage current within an operating voltage range of the secondary battery.

As a result, inventors of the present invention have found that it is possible to achieve the above safety device by using a constant-voltage device having a breakdown voltage higher than an operating voltage of the secondary battery and having low level of leakage current.

Therefore, an object of the present invention is providing a secondary battery having a constant-voltage device as a safety device capable of protecting the secondary battery from accidents caused by the overcharge of the secondary battery, in which the leakage current can be minimized within an operating voltage range of the secondary battery and accidental ignition or explosion of the secondary battery and excessive overcharge of the secondary battery can be prevented.

Another object of the present invention is to provide a method for preventing accidental ignition or explosion of a secondary battery caused by the overcharge of the secondary battery.

In order to accomplish the above object, according to one aspect of the present invention, there is provided a secondary battery comprising: a constant-voltage device connected between a cathode and an anode of the secondary battery in a row, wherein a breakdown voltage of the constant-voltage device is lower than an explosion/ignition voltage of the secondary battery and a leakage current value of the constant-voltage device is less than 0.05% of a capacity value (which is expressed with a unit of "current×hour") of the secondary battery under a maximum charge voltage of the secondary battery.

If the leakage current having a value less than 0.05% of the capacity value occurs under the maximum charge voltage of the secondary battery, the leakage current can be disregarded within the range of the operating voltage of the secondary battery.

According to another aspect of the present invention, the breakdown voltage of the constant-voltage device is higher than the maximum charge voltage of the secondary battery by at least 15% and is less than an explosion or ignition voltage of the secondary battery.

The breakdown voltage of the constant-voltage device is lower than the explosion voltage or the ignition voltage of the secondary battery, so the discharge operation may occur before the secondary battery is exploded or ignited even if the voltage of the secondary battery rises above the overcharge voltage, thereby protecting the secondary battery from explosion or ignition. The leakage current value of the constant-voltage device is less than 0.05% of the capacity value of the secondary battery under the maximum charge voltage of the secondary battery, or the breakdown voltage of the constant-voltage device is higher than the maximum charge voltage of the secondary battery, and thus, the constant-voltage device rarely generates the leakage current even if the secondary battery has been charged with the maximum charge voltage.

According to still another aspect of the present invention, there is provided a method for preventing explosion or ignition of a secondary battery caused by overcharge of the secondary battery, the method comprising the steps of: preparing the secondary battery having a cathode and an anode; and connecting a constant-voltage device between the cathode and the anode of the secondary battery in a row, wherein a breakdown voltage of the constant-voltage device is higher than a maximum charge voltage of the secondary battery by at least 15% and is less than an explosion or ignition voltage of the secondary battery.

BRIEF DESCRIPTION OF THE DRAWINGS

The foregoing and other objects, features and advantages of the present invention will become more apparent from the following detailed description when taken in conjunction with the accompanying drawings.

BRIEF DESCRIPTION OF THE INDICATIONS

Figure 1:
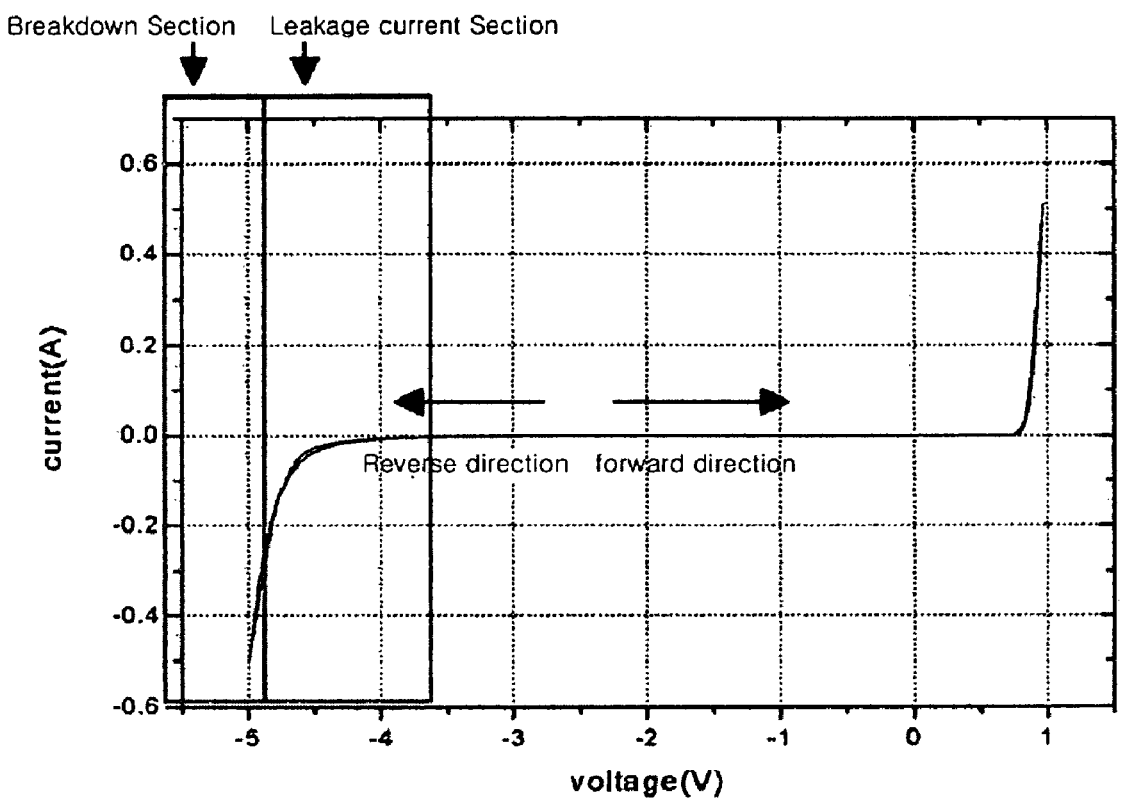
FIG. 1 is a graph illustrating a leakage current section and a breakdown section corresponding to the voltage applied to a 1 W 4.3V (zener voltage) zener diode, which is a kind of constant-voltage devices.

1: anode terminal 2: cathode terminal
3: secondary battery 4: constant-voltage device

BEST MODE FOR CARRYING OUT THE INVENTION

Hereinafter present invention will be described in detail.

According to the present invention, a constant-voltage device is installed between a cathode and an anode of a secondary battery in order to allow a current to flow fast through the constant-voltage device when a voltage exceeding a predetermined voltage level is applied to the secondary battery. The constant-voltage device prevents the secondary battery from being subject to an excessive overcharge, so that accidental ignition or explosion of the secondary battery can be prevented.

According to the present invention, the constant-voltage device signifies a device having characteristics of allowing a current to flow fast when a voltage exceeding a predetermined voltage is applied between terminals. That is, the constant-voltage device according to the present invention is a bypass device for bypassing the current under the predetermined voltage condition. For instance, as can be understood from the voltage-current graph shown in FIG. 1, the constant-voltage device shuts off the current when the voltage is lower than the predetermined reference voltage and allows the current to flow fast when the voltage is higher than the predetermined reference voltage. Such a constant-voltage device is provided in the secondary battery of the present invention, thereby improving safety of the secondary battery by protecting the secondary battery in a way of discharging current when the secondary battery is subject to the overcharge.

For example, the constant-voltage device includes a zener diode and a varistor.

The zener diode is a device using the zener effect. The zener effect means a phenomenon, in which energy of an upper end of a valence band becomes identical to energy of a lower end of a conduction band when a high voltage is applied to a semiconductor so that electrons are shifted from the valence band into the conduction band due to the tunnel effect, thereby causing the current flow. That is, according to the zener effect, electrons are excited from the valence band into the conduction band due to the tunnel effect caused by a strong electric field created in the semiconductor, thereby increasing the current.

The zener diode having the above characteristics can be fabricated in the form of a semiconductor p-n junction diode. If a relatively high voltage is applied to the zener diode in the reverse direction thereof, the high current may be created under a specific voltage and the voltage is constantly maintained (see, FIG. 1). That is, if the relatively high voltage is applied to the p-n junction diode in the reverse direction thereof, a great amount of currents is generated at a predetermined voltage value and the voltage is constantly maintained. The above phenomenon is called "breakdown" and the voltage thereof is called a "breakdown voltage".

Zener voltage is a voltage in which a current of a zener diode starts to flow, that is, a voltage in which a zener diode starts to operate. Generally, breakdown voltage is higher than zener voltage.

The zener diode is connected to the secondary battery in a row in a reverse direction. That is, a p-type terminal of the zener diode is connected to an anode of the secondary battery and an n-type terminal of the zener diode is connected to a cathode of the secondary battery (see, FIG. 5).

The varistor is a non-linear semiconductor resistor and a resistance value of the varistor may vary depending on voltages applied to both terminals of the varistor. The varistor is an abbreviation for a "variable resistor". The varistor is classified into a symmetrical varistor, in which resistance is determined according to voltage intensity regardless of polarity of the voltage applied thereto, and an asymmetrical varistor in which resistance varies depending on polarity of the voltage applied thereto. Preferably, the symmetrical varistor is employed in the present invention.

The constant-voltage device of the present invention is commercially available. Since various constant-voltage devices having various breakdown voltages are commercially available, those skilled in the art can properly select the constant-voltage device adaptable for the present invention.

Preferably the constant-voltage device employed in the present invention satisfies the following conditions. First, the constant-voltage device does not generate the leakage current under the voltage level below the maximum charge voltage of the secondary battery or does not generate additional leakage current except for its own intrinsic leakage current. Second, the constant-voltage device can prevent the voltage of the secondary battery from rising to a level that may cause explosion or ignition of the batter even if the power (voltage) is continuously applied to the secondary battery in a state that the secondary battery has been overcharged.

To this end, the constant-voltage device according to the present invention has a breakdown voltage lower than an explosion or ignition voltage of the secondary battery. In addition, the leakage current value of the constant-voltage device generated under the maximum charge voltage of the secondary battery is less than 0.05% of a capacity value, which is expressed with a unit of "current×hour", of the secondary battery. For instance, if the capacity value of the secondary battery is 500 mAh, the leakage current caused by the constant-voltage device must be maintained in a level below 0.25 mA under the maximum charge voltage of the secondary battery. Such an amount of the leakage current causes the secondary battery to be completely discharged when the leakage current continuously occurs for about 2000 hours, so the above leakage current can be disregarded in practice.

According to another embodiment of the present invention, the breakdown voltage of the constant-voltage device is preferably higher than the maximum charge voltage of the secondary battery by at least 15% and is preferably lower than the explosion voltage or the ignition voltage of the secondary battery. More preferably, the breakdown voltage of the constant-voltage device is higher than the maximum charge voltage of the secondary battery by at least 20%.

Those skilled in the art can properly adjust the value of the breakdown voltage of the constant-voltage device. According to the present invention, it is not necessary to use the constant-voltage device having an excessively high breakdown voltage. That is, it is not necessary for the constant-voltage device to have the excessively high breakdown voltage if the constant-voltage device can restrict the leakage current under the voltage level below the maximum charge voltage of the secondary battery, which is the normal operating voltage of the secondary battery. The maximum value of the breakdown voltage may vary depending on the kind of the secondary batteries.

If the breakdown voltage of the constant-voltage device is higher than the maximum charge voltage of the secondary battery by at least 15%, the leakage current can be disregarded occur within the operating voltage range of the secondary battery. In this case, as can be understood from embodiments and a comparative example of the present invention to be described below, the leakage current value caused by the constant-voltage device can be maintained less than 0.05% of the capacity value (current×hour) of the secondary battery.

Manufacturers for the secondary battery can properly determine the maximum charge voltage and the explosion/ignition voltage of the secondary battery. That is, the maximum charge voltage is the maximum operating voltage of the secondary battery, which is marked on the secondary battery by the manufacturer. In addition, the explosion/ignition voltage of the secondary battery is the maximum allowable voltage of the secondary battery, which is determined by the manufacturer while taking the safety of the secondary battery into consideration.

The secondary battery according to the present invention includes a lithium ion battery. In general, the lithium ion battery has a maximum charge voltage (maximum operating voltage) of 4.2V. Accordingly, it is preferred for the constant-voltage device to have the breakdown voltage of at least 5V. Since the lithium ion battery may be exposed to explosion or ignition when the voltage thereof rises up to 20V, the constant-voltage device preferably has the breakdown voltage less than 20V, more preferably, less than 12V.

Since the secondary battery according to the present invention has the leakage current value less than 0.05% of the capacity value of the secondary battery under the maximum charge voltage of the secondary battery, the leakage current can be disregarded when comparing it with the operating voltage of the secondary battery. In addition, since the secondary battery of the present invention includes the constant-voltage device having the breakdown voltage higher than the maximum charge voltage of the secondary battery by at least 15%, the constant-voltage device may not cause the leakage current even if the secondary battery has been charged with the maximum charge voltage (4.2V).

In the meantime, the breakdown voltage of the constant-voltage device is lower than the explosion voltage or the ignition voltage of the secondary battery, so the current flows fast towards the constant-voltage device when the voltage rises above the breakdown voltage of the constant-voltage device, thereby discharging the secondary battery. Thus, it is possible to prevent the accidental explosion or ignition of the secondary battery caused by the excessive voltage applied to the secondary battery.

Although the constant-voltage device according to the present invention cannot prevent the secondary battery from being overcharged, but it can prevent explosion or ignition of the secondary battery caused by the overcharge of the secondary battery.

In addition, the present invention provides a method for preventing explosion or ignition of the secondary battery caused by the overcharge of the secondary battery by connecting the constant-voltage device between a cathode and an anode of the second battery in a row.

As described above, the constant-voltage device of the present invention has a simple structure and can be easily installed in the secondary battery, so the constant-voltage device can be used as an inexpensive safety device for the secondary battery. Thus, if the constant-voltage device is applied to a bare cell, which is not equipped with a separate safety device, the constant-voltage device may serve as a safety device for the bare cell, while allows the bare cell to be fabricated with a simple structure at a low cost. In addition, the constant-voltage device may prevent explosion or ignition of the bare cell. In addition, it is also possible to apply the constant-voltage device to the secondary battery having a separate safety device. In this case, the constant-voltage device may serve as a secondary safety device for additionally preventing explosion or ignition of the secondary battery.

Hereinafter, the present invention will be described in more detail with reference to accompanying drawings.

FIG. 1 is a graph illustrating a leakage current section and a breakdown section corresponding to the voltage applied to a 1 W 4.3V (zener voltage) zener diode, which is a kind of constant-voltage devices. Because leakage current is very high raging about several mA even in a voltage of 4.2V, it is almost impossible to use the zener diode in a general usage range of a battery. In the meantime, the current is too low to flow all the charge current to the zener diode, and thus it is impossible to prevent overcharge of the battery. Although, leakage current of a zener diode is different according to the capacity and zener voltage of the zener diode, the graph of voltage vs. current is similar to FIG. 1. When a zener diode having zener voltage similar to or a little higher than the maximum charge voltage of the secondary battery is used to prevent overcharge, if a zener diode with smaller capacity is used to prevent leakage current, it is difficult to flow sufficient current at 4.2V, and if a zener diode with larger capacity is used to increase the current at 4.2V, it is impossible to avoid the reduction of the capacity of the battery. Therefore, it is impossible to prevent the overcharge of the battery by using zener diode.

In general, the zener diode generates the leakage current when a voltage higher than a certain voltage is applied thereto. In addition, if a voltage higher than the voltage causing the leakage current is continuously applied to the zener diode, the breakdown may occur. Referring to FIG. 1, if a voltage above 3.5V is applied to the zener diode in a reverse direction thereof, the zener diode generates the leakage current in the leakage current section. In this state, if the voltage rises up to 4.6V, breakdown of the zener diode may occur in the breakdown section. According to the graph shown in FIG. 1, there is a voltage difference of about 1V between the starting point of the leakage current section and the starting point of the breakdown section. For reference, the leakage current value becomes high and an interval between the starting point of the leakage current section and the starting point of the breakdown section becomes enlarged as the capacity of the zener diode increases.

Hereinafter, the present invention will be described in detail with reference to the examples thereof. The following examples are illustrative purposes only and not intended to limit the scope of the present invention.

Example 1

A secondary battery is prepared with a cathode including a positive active material ($LiCoO_2$), a conducting agent and a binder in a ratio of 95:2.5:2.5 and an anode including a negative active material (carbon), a conducting agent and a binder in a ratio of 94:2:4. In addition, a separator is interposed between the cathode and the anode. An electrolyte including EC and EMC mixed with 1M of $LiPF_6$ is injected into the secondary battery and a pouch is used as an outer case of the secondary battery, thereby obtaining a polymer battery.

The above battery is a lithium secondary battery having a maximum charge voltage of 4.2V. In addition, the explosion or ignition voltage of the above battery is higher than 12V. A zener diode having a breakdown voltage of about 5 to 12V is connected between the cathode and the anode in a row. Then, the secondary battery is overcharged with 20V-1A. That is, the secondary battery is charged up to 20V using the current of 1Ah. Then, the battery (cell) temperature, the zener diode temperature, voltage variation of the battery, and the current applied to the zener diode are measured.

Figure 5:
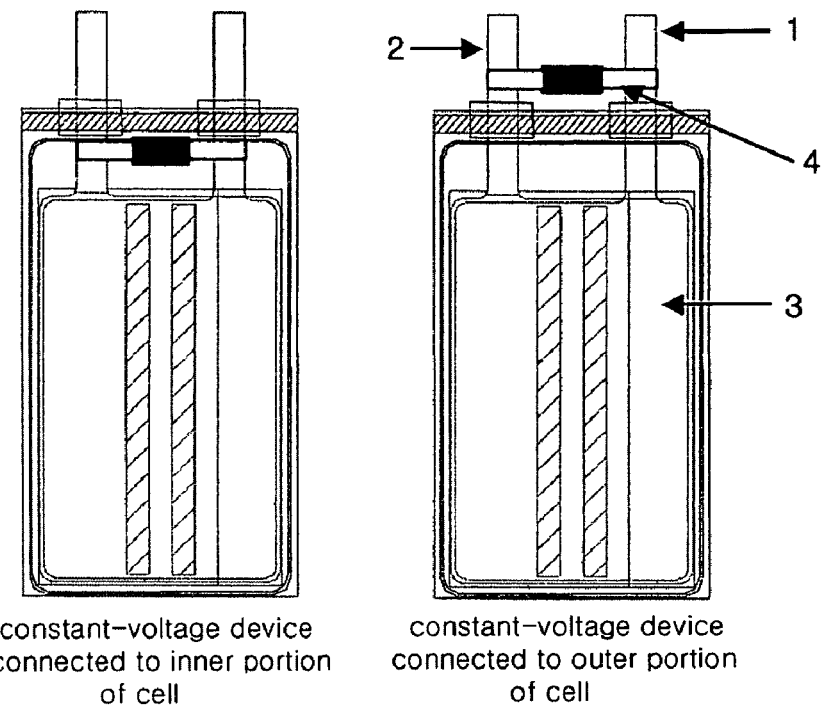
FIG. 5 is a view illustrating cells equipped with constant-voltage devices installed at an inner portion and an outer portion of the cells, respectively.
Figure 6:
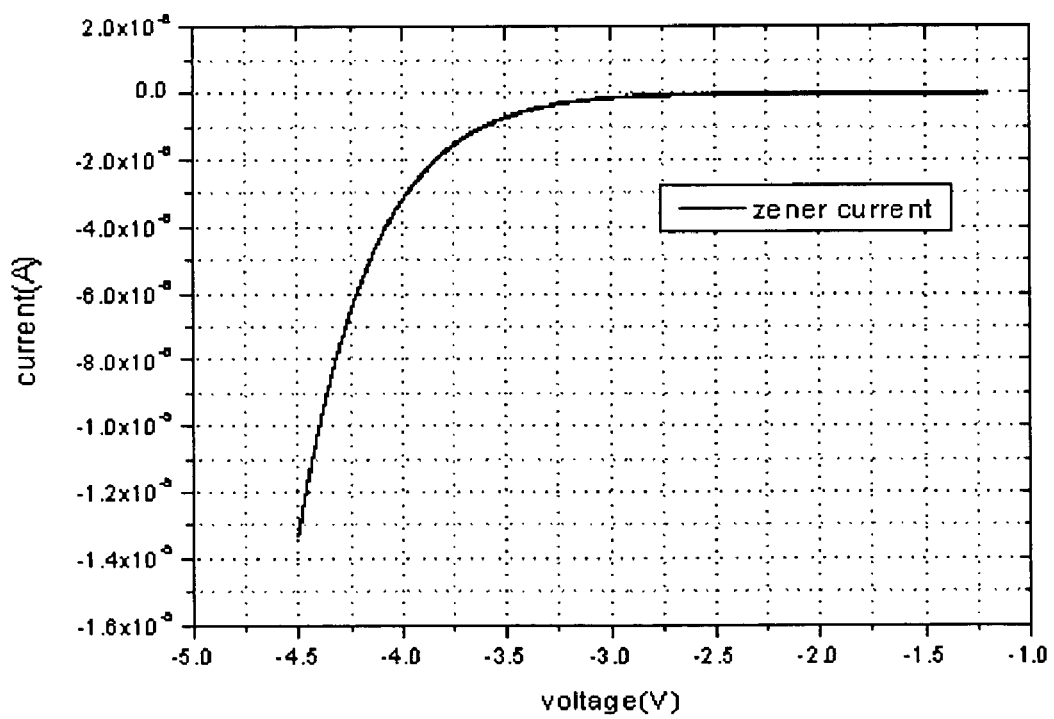
FIG. 6 is a graph illustrating current according to the voltage applied to a 1 W 5.1V (zener voltage) zener diode. In the voltage range of 2.0V to 4.5V, leakage current is about tens of nA to several μA, which is very low level. With regard to breakdown voltage of the zener diode, breakdown occurs at about 6V.

FIG. 5 is a view illustrating cells equipped with constant-voltage devices (zener diodes) installed at an inner portion and an outer portion of the cells, respectively. As shown in the left part of FIG. 5, the constant-voltage device can be connected between the cathode and the anode in a row at an inner portion of a battery pack. In addition, as shown in the right part of FIG. 5, the constant-voltage device can be connected between the cathode and the anode in a row at an outer portion of the battery pack. The secondary battery as shown in the right part of FIG. 5 is employed in Example 1.

Figure 2:
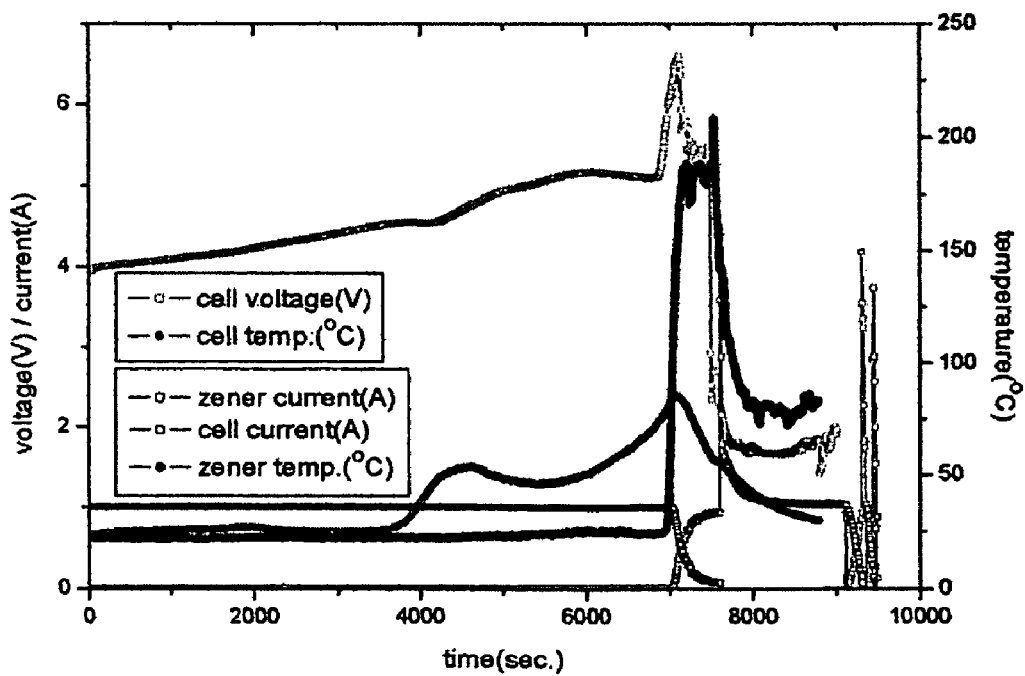
FIG. 2 is a graph illustrating the cell temperature, the zener diode temperature, voltage variation of a cell, and the current applied to a zener diode according to the Example 1 of the present invention, which are measured by connecting the zener diode having a zener voltage of 5.1V between a cathode and an anode of the cell such that the cell is overcharged with 20V-1A.

FIG. 2 is a graph illustrating the measurement result of the cell temperature, the zener diode temperature, voltage variation of the cell, and the current applied to the zener diode when the zener diode having the zener voltage of 5.1V is employed.

(1) The battery (cell) voltage continuously rises as an external voltage is continuously applied to the battery (cell).

(2) The cell temperature starts to increase when the charge voltage of the cell reaches 4.5V.

(3) Discharge of the zener diode starts when the charge voltage of the cell reaches 5.1V beyond 5V, so that the current flows fast through the zener diode and the temperature of the zener diode suddenly rises. However, the cell voltage does not rise above 7V.

(4) As a result of the discharge of the zener diode, the current does not flow through the battery (cell) and explosion or ignition of the battery does not occur.

Example 2

Figure 3:
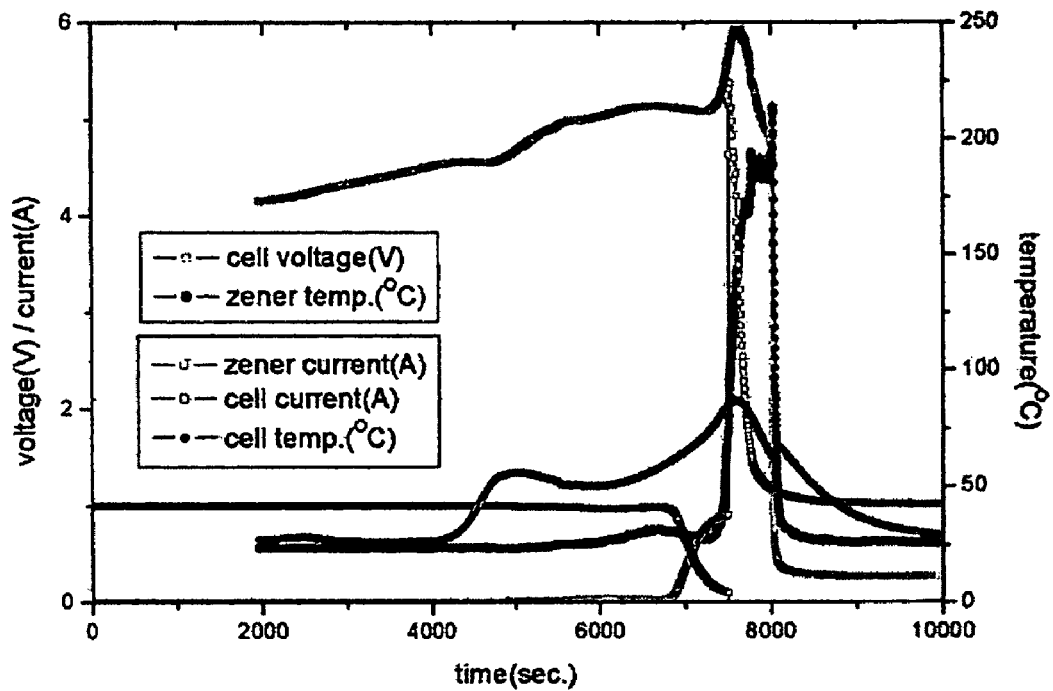
FIG. 3 is a graph illustrating the cell temperature, the zener diode temperature, voltage variation of a cell, and the current applied to a zener diode according to the Example 2 of the present invention, which are measured by connecting the zener diode having a breakdown voltage of about 5V between a cathode and an anode of the cell such that the cell is overcharged with 33V-1A.
Figure 4:
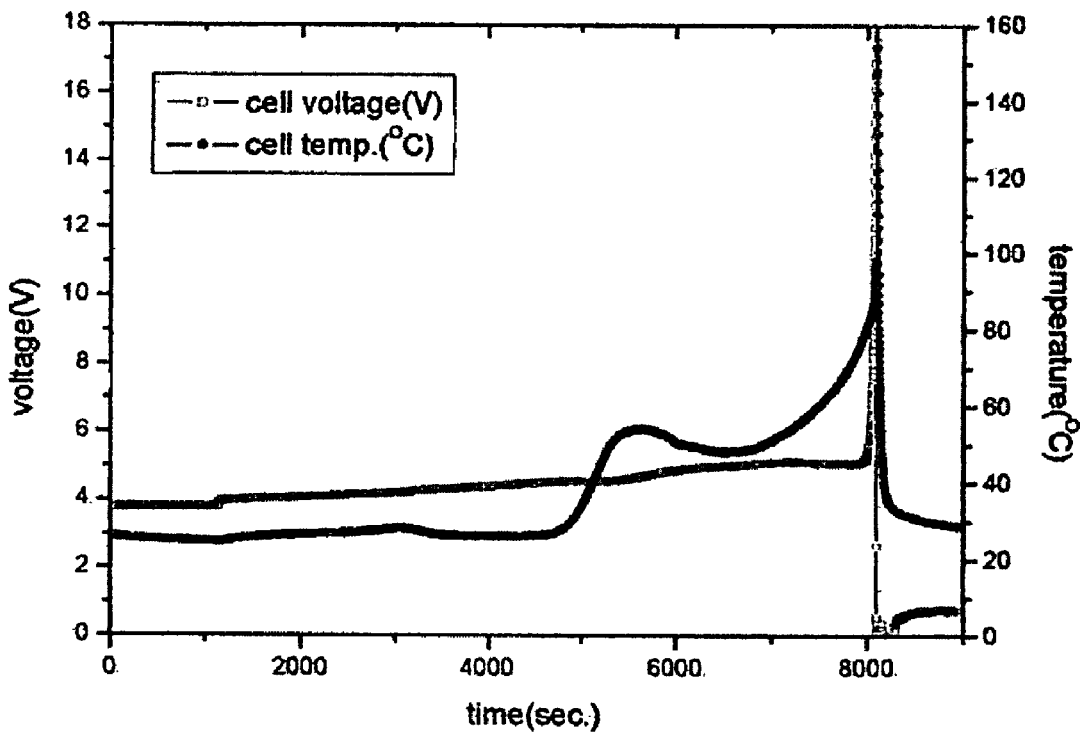
FIG. 4 is a graph illustrating ignition and explosion of a cell according to a Comparative Example 1 in which a constant-voltage device is not provided in the cell.

The test is performed under the same condition as Example 1 except that the secondary battery is overcharged with 33V-1A. The test result is shown in FIG. 3. Similar to Example 1, explosion or ignition of the battery does not occur in Embodiment 2.

(1) The battery (cell) voltage continuously rises as an external voltage is continuously applied to the battery (cell).

(2) The cell temperature starts to increase when the charge voltage of the cell reaches 4.5V.

(3) Discharge of the zener diode starts when the charge voltage of the cell reaches 5.1V, so that the current flows fast through the zener diode and the temperature of the zener diode suddenly rises. However, the cell voltage does not rise above 7V.

(4) As a result of the discharge of the zener diode, the current does not flow through the battery (cell) and explosion or ignition of the battery does not occur.

As can be seen from FIGS. 2 and 3 illustrating test results of Examples 1 and 2, since the leakage current value is less than 0.05% of the capacity value of the secondary battery under the maximum charge voltage of the secondary battery, the leakage current can be disregarded within the range of the operating voltage of the secondary battery. In addition, since the zener diode (constant-voltage device) has the breakdown voltage of 5V, which is higher than the maximum charge voltage of the secondary battery by at least 15%, the leakage current can be disregarded when the above zener diode is used for the secondary battery.

In the meantime, since the breakdown voltage of the zener diode is lower than the explosion or ignition voltage of the secondary battery, the zener diode is enabled before the secondary battery is exploded or broken, thereby preventing the voltage from rising. Thus, the voltage may not rise up to the explosion or ignition voltage of the secondary battery.

Comparative Example 1

The test is performed under the same condition as Example 1 except that the zener diode is not connected to the polymer battery. As a result, ignition and explosion of the polymer battery are incurred when the polymer battery is overcharged.

(1) The battery (cell) voltage continuously rises as an external voltage is continuously applied to the battery (cell).

(2) The cell temperature starts to increase when the charge voltage of the cell reaches 4.5V. The voltage continuously increases up to 20V, thereby causing ignition and explosion of the polymer battery.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims. For instance, although the present invention has been described in relation to the lithium ion battery, the present invention is also applicable for other secondary batteries, and also applicable for cylinder type secondary batteries or square type secondary batteries. In addition, although the ignition and explosion test has been performed while connecting the constant-voltage device to the secondary battery without employing other safety devices, the ignition and explosion test can be performed together with the safety device.

INDUSTRIAL APPLICABILITY

As can be seen from the foregoing, according to the present invention, the constant-voltage device prevents accidental explosion or ignition of the secondary battery caused by the overcharge of the secondary battery, so that the safety of the secondary battery can be improved. In addition, the leakage current value is less than 0.05% of the capacity value of the secondary battery under the maximum charge voltage of the secondary battery, so the leakage current can be disregarded within the range of the operating voltage of the secondary battery. Furthermore, the breakdown voltage of the constant-voltage device is set higher than the maximum charge voltage of the secondary battery, so the leakage current of the constant-voltage device can be disregarded even if the secondary battery has been charged with the maximum charge voltage, so that the self discharge of the secondary battery can be prevented. According to the present invention, the maximum breakdown voltage of the constant-voltage device is determined such that it does not cause explosion or ignition of the secondary battery, so the explosion or ignition of the secondary battery may not occur even if the voltage is continuously applied to the secondary battery after the secondary battery has been charged with the maximum charge voltage.

Therefore, the secondary battery according to the present invention can be applied to various fields with superior safety features.

The invention claimed is:

1. A secondary battery comprising:
a constant-voltage device connected directly between a cathode and an anode of the secondary battery in a row, wherein the constant-voltage device is the only element in between the cathode and the anode;
a breakdown voltage of the constant-voltage device is lower than an explosion/ignition voltage of the secondary battery and a leakage current value of the constant-voltage device is less than 0.05% of a capacity value, which is expressed with a unit of "current×hour", of the secondary battery under a maximum charge voltage of the secondary battery;
when the voltage of the secondary battery rises exceeding the breakdown voltage of the constant-voltage device, the resistance of the constant-voltage device drops near to zero, and a current flows through the constant-voltage device between the cathode and the anode discharging the secondary battery substantially in a short circuit state;
wherein the breakdown voltage of the constant-voltage device is in a range of 5 to 20V; and the maximum charge voltage of the secondary battery is 4.2V or less.

2. The secondary battery according to claim 1, wherein the constant-voltage device is a zener diode or a varistor.

3. The secondary battery according to claim 2, wherein the constant-voltage device is the zener diode, in which the zener diode is connected in reverse direction.

4. The secondary battery according to claim 1, wherein the secondary battery includes a lithium ion battery.

5. A secondary battery comprising:
   a constant-voltage device connected between a cathode and an anode of the secondary battery in a row,
   wherein the constant-voltage device is the only element in between the cathode and the anode;
   a breakdown voltage of the constant-voltage device is higher than a maximum charge voltage of the secondary battery by at least 15% and is less than an explosion/ignition voltage of the secondary battery;
   when the voltage of the secondary battery rises exceeding the breakdown voltage of the constant-voltage device, the resistance of the constant-voltage device drops near to zero, and a current flows through the constant-voltage device between the cathode and the anode discharging the secondary battery substantially in a short circuit state;
   wherein the breakdown voltage of the constant-voltage device is in a range of 5 to 20V; and
   the maximum charge voltage of the secondary battery is 4.2V or less.

6. The secondary battery according to claim 5, wherein the constant-voltage device is a zener diode or a varistor.

7. The secondary battery according to claim 6, wherein the constant-voltage device is the zener diode, in which the zener diode is connected in reverse direction.

8. The secondary battery according to claim 5, wherein the secondary battery includes a lithium ion battery.

* * * * *